Reissued July 27, 1943

Re. 22,357

UNITED STATES PATENT OFFICE 22,357

ALLOY

James M. Lohr, Morristown, N. J., assignor to Driver-Harris Company, Harrison, N. J., a corporation of New Jersey No Drawing. Original No. 2,005,433, dated June 18, 1935, Serial No. 360, January 4, 1935. Application for reissue April 24, 1943, Serial No. 484,442

6 Claims. (Cl. 75—171)

This invention relates to alloys and more particularly to alloys for electrical resistance units.

In the manufacture of electrical resistance units, an alloy having the property of resisting oxidation at high temperatures is essential. The alloys forming the subject matter of my invention are characterized by the ability to resist oxidation and by a prolonged life, exceeding that of other known alloys, when used under high temperature conditions.

While nickel-chromium and nickel-chromium-iron alloys having the ability to resist oxidation at high temperatures are known, their period of usefulness in service is often not as long as desired. I have found that the addition of small quantities of calcium, zirconium and aluminum to such nickel-chromium alloys greatly increases their period of life when employed under conditions where they are subjected to high temperatures. The alloys forming the subject matter of the present application may also contain small quantities of either silicon or manganese or both of these elements.

In carrying out my invention I add small quantities of calcium, zirconium and aluminum, with or without silicon or manganese to nickel-chromium or nickel-chromium-iron alloys. The nickel-chromium alloy most generally used in the art consists of 80 parts of nickel and 20 parts of chromium and I find it advantageous to add the other metals mentioned above to nickel-chromium alloys of substantially these proportions. The proportions of nickel and chromium in the alloy may be varied. Thus the chromium content may be from 15 to 25 percent and the balance nickel.

Likewise the most generally used proportions of nickel, chromium and iron in nickel-chromium-iron alloys is 60 percent nickel, 10 to 15 percent chromium and the balance iron and I find it advantageous to employ substantially these proportions of those ingredients, adding the calcium and zirconium. These proportions may also be varied, the nickel, however, forming the major part of the alloy, and the nickel-chromium content being such that the alloy will have the characteristics of a non-ferrous alloy. Thus, I may employ from 10 percent to 18 percent chromium, 17 to 30 percent iron and the balance nickel.

In preparing alloys containing the additional elements enumerated, the quantities of the additional elements are subtracted from the nickel content, as for example, when calcium, zirconium and aluminum are added to an alloy containing 15 to 25 percent chromium and the balance nickel, the final alloy will contain 15 to 25 percent chromium, calcium, zirconium and aluminum in the percentages herein stated and the balance nickel.

The proportions of calcium, zirconium and aluminum may vary with in certain limits. I have found that the best results are obtained when these metals are present in the nickel-chromium or nickel-chromium-iron alloy within the following limits:

| | Percent |
|---|---|
| Calcium | .01– .20 |
| Zirconium | .01– .50 |
| Aluminum | .01–1.00 |

If manganese or silicon are employed, they may be used within the following limits:

| | Percent |
|---|---|
| Manganese | 0.02–2.0 |
| Silicon | 0.20–2.0 |

The preferred proportions of the alloying agents are the following:

| | Percent |
|---|---|
| Calcium | .03 |
| Zirconium | .25 |
| Aluminum | .07– .38 |
| Manganese | 0.05–1.0 |
| Silicon | 0.40–1.0 |

Nickel-chromium and nickel-chromium-iron alloys containing the above ingredients within the proportions given have been found by tests to have a greatly increased period of life when exposed to high temperatures. For the purpose of determining the life of such alloys at high temperatures I have tested them by the method of test outlined in "Tentative accelerated life test for metallic materials for electrical heating" of the American Society For Testing Materials described in vol. 29 of the "Proceedings of the Thirty-Second Annual Meeting of the American Society For Testing Materials" beginning on page 613. The method is substantially as follows:

A sample of the wire to be tested, free from kinks, approximately twelve inches long and of about .025" diameter, is mounted vertically on the test board, the upper end being held in position by means of a suitable binding post. A 10 gram weight is attached to the lower end of the specimen. A short piece of wire is attached to the 10 gram weight and projects downward into a cup of mercury where it may move freely up and down. A rheostat and an interrupter are connected in series with the specimen to the power supply. The test is run on constant temperature at a standard temperature chosen for the alloy under consideration for the first twenty-four hours. Thereafter it is run on constant voltage to the burnout. The life in hours up to a 10 percent increase in resistance is known as useful life while the life to the burnout is known as total life. Throughout the test the power is on two minutes and off two minutes. This is accomplished by means of an interrupter.

In testing the alloys of my invention according to the above described method a reference sample composed of 80 percent nickel and 20 percent chromium and no alloy additions having an approximate life of 90 hours was used. This value is considered as 100 percent and the useful life of the samples tested is determined in corresponding percentage values. In the following table the results obtained with samples containing calcium, zirconium and aluminum are given:

| No. | Ca | Zr | Al | Per cent useful life |
|---|---|---|---|---|
| 17 | .01 | .27 | .38 | 725 |
| 18 | .01 | .18 | .07 | 575 |
| 19 | .03 | .19 | .26 | 795 |
| 20 | .04 | .17 | .23 | 735 |
| 22 | .02 | .21 | .44 | 525 |
| 23 | .02 | .22 | .52 | 620 |

It will be noted that the useful life of such samples is from 575 percent to 795 percent of the standard sample. When calcium, zirconium or aluminum alone was added to a nickel-chromium alloy of the same composition, the useful life was in all cases less than 200 percent. The use of calcium, zirconium and aluminum therefore greatly increases the useful life of the alloy for electrical resistance purposes where the wire is exposed to a high temperature.

This application is a continuation in part of my copending application Serial No. 748,084, filed October 12, 1934 (now Patent No. 2,005,431, issued June 18, 1935) and the claims herein are directed to a nickel-chromium-iron alloy containing calcium, zirconium and aluminum.

In the alloys referred to herein, small amounts of phosphorous and sulphur may be present as impurities. The nickel may also contain about 1 percent of cobalt.

Having thus described my invention, what I claim is:

1. A nickel-chromium-iron alloy containing 10 to 15 percent chromium, 25 to 30 percent iron, .01 to .20 percent calcium, .01 to .50 percent zirconium and .01 to 1.0 percent aluminum, balance nickel.

2. A nickel-chromium-iron alloy containing 10 to 15 percent chromium, 25 to 30 percent iron, substantially .03 percent calcium, substantially .20 percent zirconium and from .07 to .38 percent aluminum, balance nickel.

3. A nickel-chromium-iron alloy containing 10 to 18 percent chromium, 17 to 30 percent iron, .01 to .20 percent calcium, .01 to .50 percent zirconium and .01 to .10 percent aluminum, balance nickel.

4. An electric resistance element comprising 10 to 15 percent chromium, 25 to 30 percent iron, .01 to .20 percent calcium, .01 to .50 percent zirconium, .01 to 1.0 percent aluminum, balance nickel.

5. An electric resistance element comprising 10 to 15 percent chromium, 25 to 30 percent iron, substantially .03 percent calcium, substantially .20 percent zirconium, from .07 to .38 percent aluminum, balance nickel.

6. An electric resistance element comprising 10 to 18 percent chromium, 17 to 30 percent iron, .01 to .20 percent calcium, .01 to .50 percent zirconium, .01 to .10 percent aluminum, balance nickel.

JAMES M. LOHR.